(12) United States Patent
Harutyunyan

(10) Patent No.: US 11,535,517 B2
(45) Date of Patent: Dec. 27, 2022

(54) METHOD OF MAKING SELF-STANDING ELECTRODES SUPPORTED BY CARBON NANOSTRUCTURED FILAMENTS

(71) Applicant: HONDA MOTOR CO., LTD., Tokyo (JP)

(72) Inventor: Avetik R. Harutyunyan, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 782 days.

(21) Appl. No.: 16/287,621

(22) Filed: Feb. 27, 2019

(65) Prior Publication Data

US 2020/0239317 A1    Jul. 30, 2020

Related U.S. Application Data

(60) Provisional application No. 62/796,512, filed on Jan. 24, 2019.

(51) Int. Cl.
| | |
|---|---|
| *H01M 4/04* | (2006.01) |
| *C01B 32/166* | (2017.01) |
| *H01M 4/485* | (2010.01) |
| *H01M 4/1391* | (2010.01) |
| *H01M 4/505* | (2010.01) |
| *H01M 4/525* | (2010.01) |
| *H01M 4/62* | (2006.01) |
| *H01M 10/0525* | (2010.01) |

(52) U.S. Cl.
CPC ......... *C01B 32/166* (2017.08); *H01M 4/0402* (2013.01); *H01M 4/1391* (2013.01); *H01M 4/485* (2013.01); *H01M 4/505* (2013.01); *H01M 4/525* (2013.01); *H01M 4/625* (2013.01); *C01B 2202/22* (2013.01); *H01M 10/0525* (2013.01)

(58) Field of Classification Search
CPC .................................................. H01M 4/0404
See application file for complete search history.

(56) References Cited

U.S. PATENT DOCUMENTS

| | | | |
|---|---|---|---|
| 3,513,034 | A | 5/1970 | Fischbach et al. |
| 3,772,084 | A | 11/1973 | Scholle |

(Continued)

FOREIGN PATENT DOCUMENTS

| | | |
|---|---|---|
| CN | 1922347 A | 2/2007 |
| CN | 1972739 A | 5/2007 |

(Continued)

OTHER PUBLICATIONS

Communication dated Jan. 6, 2021, from the Japanese Patent Office in related application No. 2020-002545.

(Continued)

*Primary Examiner* — Austin Murata
(74) *Attorney, Agent, or Firm* — ArentFox Schiff LLP; Mark Duell

(57) ABSTRACT

The present disclosure is directed to methods for production of composites of carbon nanotubes and electrode active material from liquid dispersions. Composites thusly produced may be used as self-standing electrodes without binder or collector. Moreover, the method of the present disclosure may allow more cost-efficient production while simultaneously affording control over nanotube loading and composite thickness.

10 Claims, 9 Drawing Sheets

(56) References Cited

U.S. PATENT DOCUMENTS

| | | | |
|---|---|---|---|
| 5,985,175 A | 11/1999 | Fan et al. |
| 7,094,385 B2 | 8/2006 | Beguin et al. |
| 7,288,870 B2 | 10/2007 | Mitcham et al. |
| 7,348,101 B2 | 3/2008 | Gozdz et al. |
| 7,622,059 B2 | 11/2009 | Bordere et al. |
| 7,999,028 B2 | 8/2011 | Lin et al. |
| 8,083,905 B2 | 12/2011 | Choi et al. |
| 8,084,158 B2 | 12/2011 | Chu et al. |
| 8,293,204 B2 | 10/2012 | Khodadadi et al. |
| 8,435,676 B2 | 5/2013 | Zhamu et al. |
| 8,465,871 B2 | 6/2013 | Juzkow et al. |
| 8,628,747 B2 | 1/2014 | Zachariah et al. |
| 8,703,092 B2 | 4/2014 | Ziegler |
| 8,787,001 B2 | 7/2014 | Fleischer et al. |
| 8,825,178 B2 | 9/2014 | Feng et al. |
| 8,883,113 B2 | 11/2014 | Richter et al. |
| 8,974,960 B2 | 3/2015 | Manthiram et al. |
| 8,986,872 B2 | 3/2015 | Lev et al. |
| 9,034,421 B2 | 5/2015 | Mikhaylik et al. |
| 9,167,736 B2 | 10/2015 | Shah et al. |
| 9,396,829 B2 | 7/2016 | Mann et al. |
| 9,406,985 B2 | 8/2016 | Amaratunga et al. |
| 9,450,266 B2 | 9/2016 | Hosaka et al. |
| 9,502,734 B1 | 11/2016 | Lim et al. |
| 9,615,473 B2 | 4/2017 | Kim |
| 9,692,056 B1 | 6/2017 | Liu et al. |
| 9,711,763 B2 | 7/2017 | Sohn et al. |
| 9,782,082 B2 | 10/2017 | Gannon et al. |
| 9,786,872 B2 | 10/2017 | Suh et al. |
| 9,807,876 B2 | 10/2017 | Catchpole |
| 9,812,681 B2 | 11/2017 | Heo |
| 9,859,586 B2 | 1/2018 | Suh et al. |
| 9,887,644 B2 | 2/2018 | Kim et al. |
| 9,941,492 B2 | 4/2018 | Suh et al. |
| 9,972,868 B2 | 5/2018 | Choi et al. |
| 9,979,225 B2 | 5/2018 | Bernhard |
| 10,033,031 B2 | 7/2018 | Wang et al. |
| 10,090,556 B2 | 10/2018 | Rho et al. |
| 10,096,803 B2 | 10/2018 | Iseri et al. |
| 10,122,010 B2 | 11/2018 | Tajima et al. |
| 10,147,915 B2 | 12/2018 | Song et al. |
| 10,199,851 B2 | 2/2019 | Hiroki et al. |
| 10,217,971 B2 | 2/2019 | Takahashi et al. |
| 10,957,939 B2 | 3/2021 | Zhi et al. |
| 2003/0084847 A1 | 5/2003 | Wood et al. |
| 2003/0099883 A1 | 5/2003 | Ochoa et al. |
| 2004/0086783 A1 | 5/2004 | Fong et al. |
| 2004/0234445 A1 | 11/2004 | Serp et al. |
| 2005/0008778 A1 | 1/2005 | Utsugi et al. |
| 2005/0063891 A1 | 3/2005 | Shaffer et al. |
| 2005/0148887 A1 | 7/2005 | Reiter et al. |
| 2005/0209392 A1 | 9/2005 | Luo et al. |
| 2005/0221185 A1 | 10/2005 | Sakata et al. |
| 2006/0039849 A1 | 2/2006 | Resasco et al. |
| 2006/0078489 A1 | 4/2006 | Harutyunyan et al. |
| 2006/0116443 A1 | 6/2006 | Probst et al. |
| 2006/0151318 A1 | 7/2006 | Park et al. |
| 2006/0245996 A1 | 11/2006 | Xie et al. |
| 2007/0224106 A1 | 9/2007 | Sakakibara et al. |
| 2007/0274899 A1 | 11/2007 | Wolf et al. |
| 2008/0131351 A1 | 6/2008 | Wang et al. |
| 2008/0210550 A1 | 9/2008 | Walther et al. |
| 2008/0233402 A1 | 9/2008 | Carlson et al. |
| 2008/0258117 A1 | 10/2008 | Sakakibara et al. |
| 2009/0117026 A1 | 5/2009 | Shimazu et al. |
| 2009/0142659 A1 | 6/2009 | Lai et al. |
| 2009/0208708 A1 | 8/2009 | Wei et al. |
| 2009/0226704 A1 | 9/2009 | Kauppinen et al. |
| 2009/0274609 A1 | 11/2009 | Harutyunyan et al. |
| 2009/0286675 A1 | 11/2009 | Wei et al. |
| 2010/0000441 A1 | 1/2010 | Jang et al. |
| 2010/0038602 A1 | 2/2010 | Plee |
| 2010/0112443 A1 | 5/2010 | Blomgren et al. |
| 2010/0140560 A1 | 6/2010 | Wang et al. |
| 2010/0178543 A1 | 7/2010 | Gruner et al. |
| 2010/0221606 A1 | 9/2010 | Nalamasu et al. |
| 2010/0276644 A1 | 11/2010 | Wolf et al. |
| 2010/0285352 A1 | 11/2010 | Juzkow et al. |
| 2010/0285358 A1 | 11/2010 | Cui et al. |
| 2011/0060162 A1 | 3/2011 | Tatsuhara et al. |
| 2011/0096465 A1 | 4/2011 | Zhou et al. |
| 2011/0111279 A1 | 5/2011 | Smithyman et al. |
| 2011/0123429 A1 | 5/2011 | Bordere et al. |
| 2011/0150746 A1 | 6/2011 | Khodadadi et al. |
| 2011/0158892 A1 | 6/2011 | Yamaki |
| 2011/0171398 A1 | 7/2011 | Oladeji |
| 2011/0177393 A1 | 7/2011 | Park et al. |
| 2011/0281156 A1 | 11/2011 | Boren et al. |
| 2011/0311874 A1 | 12/2011 | Zhou et al. |
| 2012/0105370 A1 | 5/2012 | Moore |
| 2012/0107683 A1 | 5/2012 | Kim et al. |
| 2012/0121986 A1 | 5/2012 | Balu et al. |
| 2012/0132861 A1 | 5/2012 | Tamamitsu et al. |
| 2012/0138148 A1 | 6/2012 | Harutyunyan |
| 2012/0141864 A1 | 6/2012 | Juzkow et al. |
| 2012/0149824 A1 | 6/2012 | Hocke et al. |
| 2012/0156034 A1 | 6/2012 | Sabannavar et al. |
| 2012/0177934 A1 | 7/2012 | Vogel et al. |
| 2012/0193602 A1 | 8/2012 | Lieber et al. |
| 2012/0219490 A1* | 8/2012 | Noda ............... B01J 37/347 |
| | | | 422/618 |
| 2012/0241666 A1 | 9/2012 | Hong et al. |
| 2012/0282522 A1 | 11/2012 | Axelbaum et al. |
| 2012/0295161 A1 | 11/2012 | Wang et al. |
| 2012/0315539 A1 | 12/2012 | Lashmore et al. |
| 2012/0321911 A1 | 12/2012 | Watanabe et al. |
| 2013/0040229 A1* | 2/2013 | Grigorian ............ H01G 11/32 |
| | | | 361/503 |
| 2013/0065125 A1* | 3/2013 | Sawaki ............ H01M 4/0404 |
| | | | 977/948 |
| 2013/0065130 A1 | 3/2013 | Ban et al. |
| 2013/0106026 A1 | 5/2013 | Wang et al. |
| 2013/0143077 A1 | 6/2013 | Yebka et al. |
| 2013/0149440 A1 | 6/2013 | Pyzik et al. |
| 2013/0171485 A1 | 7/2013 | Kodera et al. |
| 2013/0171496 A1 | 7/2013 | Wang et al. |
| 2013/0189565 A1 | 7/2013 | Lashmore et al. |
| 2013/0224551 A1 | 8/2013 | Hiralal et al. |
| 2013/0256011 A1 | 10/2013 | Chang et al. |
| 2013/0323583 A1 | 12/2013 | Phares |
| 2014/0005960 A1 | 1/2014 | Anderson et al. |
| 2014/0013588 A1 | 1/2014 | Wang et al. |
| 2014/0021403 A1 | 1/2014 | Kim et al. |
| 2014/0057178 A1 | 2/2014 | He et al. |
| 2014/0065447 A1 | 3/2014 | Liu et al. |
| 2014/0093769 A1 | 4/2014 | Busnaina et al. |
| 2014/0141248 A1 | 5/2014 | Noyes |
| 2014/0170490 A1 | 6/2014 | Izuhara et al. |
| 2014/0178543 A1 | 6/2014 | Russell et al. |
| 2014/0255782 A1 | 9/2014 | Jabbour et al. |
| 2014/0287304 A1 | 9/2014 | Netz |
| 2014/0326181 A1 | 11/2014 | Kim |
| 2014/0370347 A1 | 12/2014 | Jung et al. |
| 2015/0010788 A1 | 1/2015 | Aria et al. |
| 2015/0037239 A1 | 2/2015 | Sue et al. |
| 2015/0044581 A1 | 2/2015 | Holme et al. |
| 2015/0059571 A1* | 3/2015 | Denton ............... B01D 46/04 |
| | | | 55/385.1 |
| 2015/0064521 A1 | 3/2015 | Watanabe et al. |
| 2015/0087858 A1 | 3/2015 | Ci et al. |
| 2015/0133569 A1 | 5/2015 | Gong et al. |
| 2015/0188112 A1 | 7/2015 | Adre et al. |
| 2015/0200417 A1 | 7/2015 | Song et al. |
| 2015/0207143 A1 | 7/2015 | Wu et al. |
| 2015/0207168 A1 | 7/2015 | Do et al. |
| 2015/0233010 A1 | 8/2015 | Pan et al. |
| 2015/0236366 A1 | 8/2015 | Chang et al. |
| 2015/0243451 A1 | 8/2015 | Kim et al. |
| 2015/0243452 A1 | 8/2015 | Gruner et al. |
| 2015/0255828 A1 | 9/2015 | Momo et al. |
| 2015/0279578 A1 | 10/2015 | Martini et al. |
| 2015/0325820 A1 | 11/2015 | Sohn et al. |
| 2015/0333302 A1 | 11/2015 | Johns et al. |
| 2015/0340684 A1 | 11/2015 | Voillequin et al. |

(56) References Cited

U.S. PATENT DOCUMENTS

| | | | |
|---|---|---|---|
| 2015/0340741 | A1 | 11/2015 | Kim et al. |
| 2015/0349325 | A1 | 12/2015 | Chen et al. |
| 2015/0364750 | A1 | 12/2015 | Maheshwari et al. |
| 2015/0372344 | A1 | 12/2015 | Iwasaki et al. |
| 2015/0380738 | A1* | 12/2015 | Zhou .................. H01M 4/625 429/223 |
| 2016/0009557 | A1* | 1/2016 | Harutyunyan ......... B01J 37/18 423/447.3 |
| 2016/0013457 | A1 | 1/2016 | Suh et al. |
| 2016/0013458 | A1 | 1/2016 | Suh et al. |
| 2016/0020437 | A1 | 1/2016 | Sohn et al. |
| 2016/0023905 | A1 | 1/2016 | Wei |
| 2016/0036059 | A1 | 2/2016 | Tokune et al. |
| 2016/0040780 | A1 | 2/2016 | Donahue |
| 2016/0049569 | A1 | 2/2016 | Negrin |
| 2016/0079629 | A1 | 3/2016 | Abe et al. |
| 2016/0082404 | A1 | 3/2016 | Pigos |
| 2016/0094079 | A1 | 3/2016 | Hiroki et al. |
| 2016/0126554 | A1 | 5/2016 | Beneventi et al. |
| 2016/0149193 | A1 | 5/2016 | Seong |
| 2016/0149253 | A1 | 5/2016 | Yi et al. |
| 2016/0166837 | A1 | 6/2016 | Strommer et al. |
| 2016/0329533 | A1 | 11/2016 | Tajima |
| 2016/0365544 | A1 | 12/2016 | Lee et al. |
| 2016/0372717 | A1 | 12/2016 | Noda |
| 2017/0005504 | A1 | 1/2017 | Rho et al. |
| 2017/0018799 | A1 | 1/2017 | Jeong |
| 2017/0033326 | A1 | 2/2017 | Goto et al. |
| 2017/0040582 | A1 | 2/2017 | Kim |
| 2017/0155098 | A1 | 6/2017 | Park et al. |
| 2017/0155099 | A1 | 6/2017 | Song et al. |
| 2017/0214052 | A1 | 7/2017 | Xu |
| 2017/0263972 | A1 | 9/2017 | Rho et al. |
| 2017/0288255 | A1 | 10/2017 | Kim et al. |
| 2017/0338439 | A1 | 11/2017 | Yokoyama |
| 2017/0338449 | A1 | 11/2017 | Rho et al. |
| 2017/0338489 | A1 | 11/2017 | Miwa et al. |
| 2018/0026236 | A1 | 1/2018 | Lee et al. |
| 2018/0062417 | A1 | 3/2018 | Choi et al. |
| 2018/0115026 | A1 | 4/2018 | Mairs |
| 2018/0240609 | A1 | 8/2018 | Park et al. |
| 2018/0241081 | A1 | 8/2018 | Deng et al. |
| 2018/0309117 | A1 | 10/2018 | Zhu et al. |
| 2019/0027638 | A1 | 1/2019 | Masuda et al. |
| 2019/0033602 | A1 | 1/2019 | Lee et al. |
| 2019/0036103 | A1 | 1/2019 | Pierce et al. |
| 2019/0088925 | A1 | 3/2019 | Harutyunyan et al. |
| 2019/0099129 | A1 | 4/2019 | Kopelman et al. |
| 2019/0115633 | A1 | 4/2019 | Akihisa |
| 2019/0122464 | A1 | 4/2019 | Delong et al. |
| 2019/0140270 | A1 | 5/2019 | Wang et al. |
| 2019/0171315 | A1 | 6/2019 | Park et al. |
| 2019/0237748 | A1* | 8/2019 | Shin ...................... H01M 4/623 |
| 2019/0393486 | A1* | 12/2019 | He ...................... H01M 4/1395 |
| 2020/0264663 | A1 | 8/2020 | Kumta et al. |
| 2021/0399289 | A1* | 12/2021 | Eshraghi ............ H01M 4/0471 |

FOREIGN PATENT DOCUMENTS

| | | |
|---|---|---|
| CN | 101801394 A | 8/2010 |
| CN | 102047488 A | 5/2011 |
| CN | 102482098 A | 5/2012 |
| CN | 102593436 A | 7/2012 |
| CN | 102674316 A | 9/2012 |
| CN | 103204492 A | 7/2013 |
| CN | 102674316 B | 5/2014 |
| CN | 204072059 U | 1/2015 |
| CN | 104752651 A | 7/2015 |
| CN | 103219467 B | 11/2015 |
| CN | 103715394 B | 1/2016 |
| CN | 205375473 U | 7/2016 |
| CN | 103280846 B | 8/2016 |
| CN | 106024969 A | 10/2016 |
| CN | 205697720 U | 11/2016 |
| CN | 106299237 A | 1/2017 |
| CN | 104392845 B | 3/2017 |
| CN | 104362326 B | 8/2017 |
| CN | 107074534 A | 8/2017 |
| CN | 107086306 A | 8/2017 |
| CN | 107611340 A | 1/2018 |
| CN | 108878717 A | 11/2018 |
| CN | 109088071 A | 12/2018 |
| CN | 208690415 U | 4/2019 |
| CN | 106129536 B | 7/2019 |
| DE | 102017123752 B3 | 3/2019 |
| EP | 2 213 369 A1 | 8/2010 |
| EP | 2 476 648 A1 | 7/2012 |
| EP | 2 835 177 A1 | 2/2015 |
| JP | 6-267515 A | 9/1994 |
| JP | 11-31502 A | 2/1999 |
| JP | 11-87875 A | 3/1999 |
| JP | 2005-272277 A | 10/2005 |
| JP | 2007-49789 A | 2/2007 |
| JP | 2008-305608 A | 12/2008 |
| JP | 2010-277925 A | 12/2010 |
| JP | 2012-512956 A | 6/2012 |
| JP | 2015-105208 A | 6/2015 |
| JP | 2015-521347 A | 7/2015 |
| JP | 2015-220004 A | 12/2015 |
| JP | 2016-25077 A | 2/2016 |
| JP | 2016-31922 A | 3/2016 |
| JP | 2016-54113 A | 4/2016 |
| JP | 2016-73196 A | 5/2016 |
| JP | 2017-130274 A | 7/2017 |
| JP | 2017-147222 A | 8/2017 |
| JP | 2017-162637 A | 9/2017 |
| KR | 10-2007-0001220 A | 1/2007 |
| KR | 10-1548465 B1 | 8/2015 |
| KR | 10-2016-0047643 A | 5/2016 |
| KR | 10-1632109 B1 | 6/2016 |
| KR | 10-2016-0114389 A | 10/2016 |
| KR | 10-2016-0127641 A | 11/2016 |
| KR | 10-2016-0129440 A | 11/2016 |
| KR | 10-2016-0129500 A | 11/2016 |
| KR | 10-1676641 B1 | 11/2016 |
| KR | 10-1676941 B1 | 11/2016 |
| KR | 10-1703516 B1 | 2/2017 |
| KR | 10-2017-0036478 A | 4/2017 |
| KR | 10-2017-0037510 A | 4/2017 |
| KR | 10-1729702 B1 | 4/2017 |
| KR | 10-1765459 B1 | 8/2017 |
| KR | 10-1795544 B1 | 11/2017 |
| KR | 10-2016-0129440 A | 11/2018 |
| KR | 10-2019-0040554 A | 4/2019 |
| WO | WO 2005/052053 A1 | 6/2005 |
| WO | WO 2005/096089 A1 | 10/2005 |
| WO | WO 2012/156297 A2 | 11/2012 |
| WO | WO 2013/052704 A1 | 4/2013 |
| WO | WO 2014/102131 A2 | 7/2014 |
| WO | WO 2014/153465 A1 | 9/2014 |
| WO | WO 2015/100762 A1 | 7/2015 |
| WO | WO 2016/031335 A1 | 3/2016 |
| WO | WO 2016/178210 A1 | 11/2016 |
| WO | WO 2017/052248 A1 | 3/2017 |
| WO | WO 2017/083566 A1 | 5/2017 |
| WO | WO 2017/120391 A1 | 7/2017 |
| WO | WO 2017/131451 A1 | 8/2017 |
| WO | WO 2018/110933 A1 | 6/2018 |
| WO | WO 2018/194414 A1 | 10/2018 |
| WO | WO 2018/194415 A1 | 10/2018 |
| WO | WO 2019/027147 A1 | 2/2019 |

OTHER PUBLICATIONS

Communication dated Dec. 22, 2020, from the Japanese Patent Office in counterpart application No. 2020-002026.
David Schiller, "Development of a Stretchable Battery Pack for Wearable Applications", submitted by David Schiller, BSc., Johannes Kepler University Linz, Nov. 2019, 28 Pages Total, https://epub.jku.at/obvulihs/content/titleinfo/4605900/full.pdf.

(56) References Cited

OTHER PUBLICATIONS

International Search Report and Written Opinion, issued by International Searching Authority in related International Application No. PCT/US2020/043017, dated Dec. 14, 2020.
Jenax Inc., Flexible Lithium Polymer Battery J . FLEX, Copyright 2014, (6 Pages Total).
Nanalyze., A Flexible Battery from Blue Spark Technologies, Apr. 8, 2014, (4 Pages Total).
Panasonic Corp., Panasonic Develops Bendable, Twistable, Flexible Lithium-ion Battery, Sep. 29, 2016, (8 Pages Total).
ProLogium Technology Co., Ltd., FLCB Flexible Type LCB, Copyright 2015, (6 Pages Total).
Sebastian Anthony., LG produces the first flexible cable-type lithium-ion battery, ExtremeTech, Aug. 30, 2012, (9 Pages Total).
The Swatch Group Ltd., A revolutionary battery by Belenos: The Watchmaker Swatch Group Has Signed An Agreement With The Chinese Geely Group For Use Of Its Innovative New Battery., as accessed on May 29, 2019, (3 Pages Total), https://www.swatchgroup.com/en/swatch-group/innovation-powerhouse/industry-40/revolutionary-battery-belenos/.
Vishwam Sankaran., Samsung is reportedly developing a curved battery for its foldable phone, Jul. 4, 2018,(4 Pages Total).
Fenghua Su et al., "High-Performance Two-Ply Yarn Supercapacitors Based on Carbon Nanotube Yarns Dotted with CO3O4 and NiO Nanoparticles", Small 2015, 11, No. 7, pp. 854-861 with Supporting Information(12 Pages Total), www.small-journal.com, (Year: 2015).
Notice of Reasons for Rejection dated Aug. 17, 2021, from the Japanese Patent Office in related application No. 2020-002545.
Notification of the First Office Action dated Jul. 16, 2021, from the State Intellectual Property Office of People's Republic of China in related Application No. 201710151455.7.
Communication dated Nov. 9, 2021, from the Japanese Patent Office in related application No. 2018-172178.
Communication issued by the International Searching Authority in corresponding International Application No. PCT/US19/49923, dated Nov. 13, 2019 (PCT/ISA/206).
A. Weidenkaff et al. "Metal Nanoparticles for the Production of Carbon Nanotube Composite Materials by Decomposition of Different Carbon Sources" Materials Science and Engineering C, vol. 19, pp. 119-123, 2002.
A.J. Clancy et al., "A One-Step Route to Solubilised, Purified or Functionalised Single-Walled Carbon Nanotunes", Journal of Materials Chemistry A, pp. 16708-16715, 2015.
Beate Krause et al., "Disperability and Particle Size Distribution of CNTs in an Aqeous Surfactant Dispersion as a Function of Ultrasonic Treatment Time" Carbon 48, pp. 2746-2754, 2010.
Chee Howe See et al., "CaCO3 Supported Co—Fe Catalysts for Carbon Nanotube Synthesis in Fluidized Bed Reactors" Particle Technology and Fluidization, vol. 54, No. 3, pp. 657-664, Mar. 2008.
Communication dated Jul. 31, 2019, from the European Patent Office in counterpart European Application No. 18194454.7.
Danafar, F. et al., "Fluidized bed catalytic chemical vapor deposition synthesis of carbon nanotubes—A review," The Chemical Engineering Journal, vol. 155, pp. 37-48, 2009.
Dunens, O., et al., "Synthesis of Multiwalled Carbon Nanotubes on Fly Ash Derived Catalysts," Environ. Sci. Technol., vol. 43, pp. 7889-7894, 2009.
Extended European Search Report issued in corresponding European Application No. 18184002.6 dated Nov. 30, 2018.
Extended European Search Report issued in corresponding European Patent Application No. 18194469.5 dated Dec. 4, 2018.
Hasegawa Kei et. al., "Lithium Ion Batteries Made of Electrodes with 99 wt% active materials and 1wt% carbon nanotubes without binder or metal foils", Journal of Power Sources, vol. 321, pp. 155-162, 2016.
Howard Wang, "Dispersing Carbon Nanotubes Usuing Surfactants" Current Opinion in Colloid & Interface Science 14, pp. 364-371, 2009.

Hu, Liangbing et al., Thin, Flexible Secondary Li-Ion Paper Batteries, ACS Nano, vol. 4, No. 10, pp. 5843-5848, 2010.
International Search Report and Written Opinion, issued by International Searching Authority in corresponding International Application No. PCT/US19/49923, dated Jan. 23, 2020.
Joo-Seong Kim et al., Supporting Information, A Half Millimeter Thick Coplanar Flexible Battery with Wireless Recharging Capability, Nano Letters 2015 15 (4), 9 Pages Total, (2015).
Kim et al., "A Half Millimeter Thick Coplanar Flexible Battery with Wireless Recharging Capability", Nano Letters, American Chemical Society, 2015, (9 Pages Total).
Kun Kelvin Fu et al., "Flexible Batteries: From Mechanics to Devices", 2016 American Chemical Society, ACS Publications, ACS Energy Letters 1, pp. 1065-1079, (2016).
Linqin Jiang et al., "Production of Aqueous Colloidal Dispersions of Carbon Nanotubes", Journal of Colloid and Interface Science, pp. 89-94, 2003.
Luo Shu et al., "Binder-Free LiCoO2/Carbon Nanotube Cathodes for High-Performance Lithium Ion Batteries" Advanced Materials, vol. 24, pp. 2294-2298, 2012.
Pu et al., "A Self-Charging Power Unit by Integration of a Textile Triboelectric Nanogenerator and a Flexible Lithium-Ion Battery for Wearable Electronics", Advanced Materials. 2015, (2015), (7 Pages Total).
Sarah Maghsoodi et al., "A Novel Continuous Process for Synthesis of Carbon Nanotubes Using Iron Floating Catalyst and MgO Particles for CVD of methane in a fluidized bed reactor" Applied Surface Science, vol. 256, pp. 2769-2774, 2010.
Sau Yen Chew et al., "Flexible free-standing carbon nanotube films for model lithium-ion batteries", Carbon 47, pp. 2976-2983, (2009).
Sheng Xu et al., "Stretchable batteries with self-similar serpentine interconnects and integrated wireless recharging systems," Nature communications 4:1543, DOI: 10.1038/ncomms2553, 8 Pages Total, (2013).
Shu Luo et al., "Binder-Free LiCoO2/ Carbon Nanotube Cathodes for High-Performance Lithium Ion Batteries", Advanced Materials 24, pp. 2294-2298, (2012).
The Extended European Search Report issued in corresponding European Patent Application No. 18186402.6 dated Oct. 11, 2018.
Wang Ke et al., "Super-Aligned Carbon Nanotube Films as Current Collectors for Lightweight and Flexible Lithium Ion Batteries" Advanced Functional Materials, vol. 23, pp. 846-853, 2013.
Xian-Ming Liu et al., "Carbon nanotube (CNT)-based composites as electrode material for rechargeable Li-ion batteries: A review", Composite Science and Technology, vol. 72, pp. 121-144, (2012).
Zhao, M.Q. et al., "Towards high purity graphene/single-walled carbon nanotube hybrids with improved electrochemical capacitive performance," Carbon, vol. 54, pp. 403-411, 2013.
Zhiqian Wang et al., "Fabrication of High-Performance Flexible Alkaline Batteries by Implementing Multiwalled Carbon Nanotubes and Copolymer Separator" Advanced Materials 26, pp. 970-976, (2014).
Zhiqiang Niu et al., "A "skeleton/skin" strategy for preparing ultrathin free-standing single-walled carbon nanotube/polyaniline films for high performance supercapacitor electrodes", The Royal Society of Chemistry 2012, Energy & Environmental Science 5, pp. 8726-8733, (2012).
Communication dated Aug. 26, 2019, from the European Patent Office in related European Application No. 18186402.6.
Communication issued by International Searching Authority in related International Application No. PCT/US19/49923, dated Nov. 13, 2019 (PCT/ISA/206).
Extended European Search Report issued in related European Patent Application No. 18173644.8 dated Oct. 12, 2018.
Extended Search Report of related EP Application No. 18 19 4454 dated Jul. 23, 2019.
International Search Report and Written Opinion, issued by International Searching Authority in related International Application No. PCT/US19/49923, dated Jan. 23, 2020.
International Search Report and Written Opinion, issued bv International Searching Authority in related International Application No. PCT/US2020/039821, dated Sep. 30, 2020.

(56) References Cited

OTHER PUBLICATIONS

International Search Report and Written Opinion, issued by International Searching Authority in related International Application No. PCT/US2020/020993, dated Jul. 2, 2020.
O.M. Marago, et al, "Optical trapping of carbon nanotubes", Physica E, 40 (2008), pp. 2347-2351.
Xiong Pu et al., "A Self-Charging Power Unit by Integration of a Textile Triboelectric Nanogenerator and a Flexible Lithium-Ion Battery for Wearable Electronics", Advanced Materials 27, pp. 2472-2478, (2015).
Communication dated Sep. 26, 2021, issued by the Korean Intellectual Property Office in related Korean Application No. 10-2018-0058433.
Aminy E. Oslfeld et al., "High-performance flexible energy storage and harvesting system for wearable electronics", www.nature.com/scientificreports, Scientific Reports, 6:26122,DOI:10.1038/srep26122, (2016), (10 Pages Total).
Communication dated Jul. 27, 2021, issued by the Korean Intellectual Property Office in related Korean Application No. 10-2020-0005929.
Sungmook Jung et al., "Wearable Fall Detector using Integrated Sensors and Energy Devices", www.nature.com/scientificreports, Scientific Reports, 5:17081, DOI: 10.1038/srep17081, (2015), (9 Pages Total).
Ying Shi et al., "Graphene-based integrated electrodes for flexible lithium ion batteries", 2D Materials 2 (2015): 024004. (Year: 2015), (9 Pages Total).
Communication dated Mar. 22, 2022, from the State Intellectual Property Office of People's Republic of China in Application No. 201811076414.7.
Communication dated Feb. 23, 2022, from the State Intellectual Property Office of People's Republic of China in Application No. 202010079226.0.
Communication dated Mar. 22, 2022, from the Japanese Patent Office in application No. 2018-142355.
Communication dated May 6, 2022, from the State Intellectual Property Office of People's Republic of China in Chinese Application No. 201710150360.3.
Shan Jiang et al., "Series in Science Communication by Chinese Academy of Sciences: Nanometer", Popular Science Press, pp. 155-157, Sep. 2013.(Cited in CN Application No. 201710150360.3, dated May 6, 2022).
Yurong Liu, "Applications of Carbon Materials in Supercapacitor", National Defense Industry Press, (p. 142, 2 pages total), Jan. 2013.(Cited in CN Application No. 201710150360.3, dated May 6, 2022).
Communication dated Jan. 27, 2022, from the State Intellectual Property Office of People's Republic of China in related Application No. 201710150360.3.
Office Action dated Jun. 28, 2022, issued by the Korean Patent Office in Korean Application No. 10-2022-0057879.
First Office Action dated Aug. 25, 2022, from the State Intellectual Property Office of People's Republic of China in Application No. 201810503719.5.
Ling-ling Gu et al., "Preparation and Applications of Carbon Nanotube/ Polymer Composites", Polymer Materials Science and Engineering, vol. 25 ,No. 11, (Nov. 2009), (5 Pages Total, abstract on p. 5).

\* cited by examiner

METHOD OF MAKING SELF-STANDING ELECTRODES SUPPORTED BY CARBON NANOSTRUCTURED FILAMENTS

CROSS REFERENCE TO RELATED APPLICATIONS

This application claims priority to U.S. Patent Application No. 62/796,512, entitled "Production of Solely Carbon Nanotubes Supported Self-Standing Electrodes for Flexible Li-Ion Batteries," filed Jan. 24, 2019. The preceding application is incorporated herein by reference in its entirety.

BACKGROUND

Single-walled carbon nanotubes (SWNTs) as additives in various matrices has become one of the most intensively studied areas for applications, owing to their excellent electrical and mechanical properties and high aspect ratio, which is crucial for composite materials. Among various applications, the exploitation of SWNTs as an additive material for performance enhancement of battery electrodes is very promising. The core of mixing technologies is based on liquid process and includes five required steps: a) synthesis of nanotubes, b) dispersion of nanotubes in the proper solvent (de-aggregation), c) functionalization of the nanotube surfaces (protecting against aggregation), d) mixing with binder, and e) mixing with active material (preparing slurry). These preferences are not only expensive, but they also degrade nanotube properties; for example, dispersion by ball milling, sonication, etc. leads to the inevitable reduction of aspect ratio and the introduction of defects, and as a result, more nanotube loading (weight %) is required for improved performance.

SUMMARY

In some embodiments, the present disclosure is directed to a method of making a self-standing electrode, the method comprising providing a liquid dispersion comprising carbon nanotubes or carbon fibers and a liquid medium; and wet-depositing the carbon nanotubes or the carbon fibers from the liquid dispersion to a moving substrate, which is pre-deposited with an electrode active material, to form a composite comprising both the carbon nanotubes or the carbon fibers and the electrode active material.

In some embodiments, the present disclosure is directed to a method of making a self-standing electrode, the method comprising: providing a first liquid dispersion comprising carbon nanotubes or carbon fibers and a first liquid medium; providing a second liquid dispersion comprising an electrode active material and a second liquid medium; and simultaneously wet-depositing the first liquid dispersion and the second dispersion to a moving substrate to form a composite.

In some embodiments, the present disclosure is directed to a method of making a self-standing electrode, the method comprising providing a single liquid dispersion comprising carbon nanotubes or carbon fibers, an electrode active material, and a liquid medium; and wet-depositing the single liquid dispersion to a moving substrate to form a composite.

BRIEF DESCRIPTION OF THE DRAWINGS

The accompanying drawings, together with the specification, illustrate exemplary embodiments, and, together with the description, serve to explain the principles of these embodiments.

DETAILED DESCRIPTION

Figure 1:
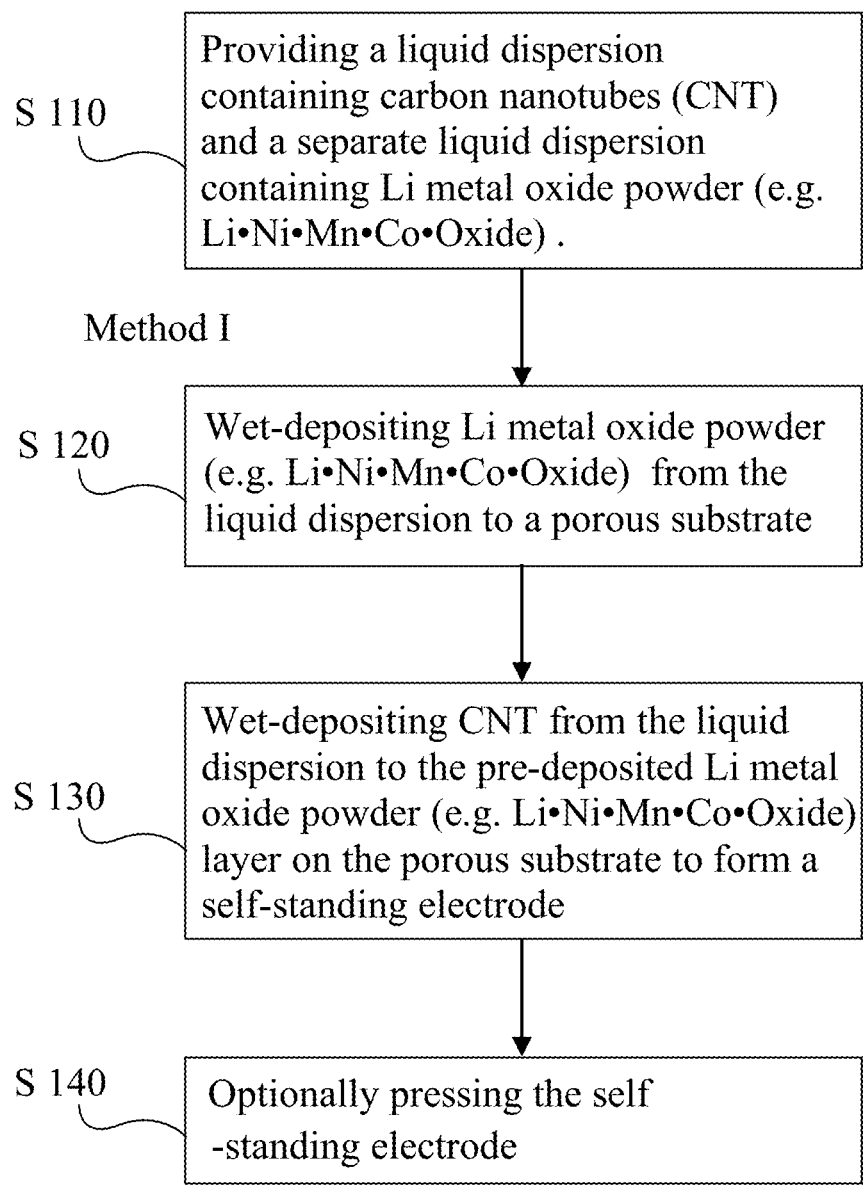
FIG. 1 is a schematic block diagram illustrating an exemplary method (methods I) of making a self-standing electrode.

The present disclosure provides methods for producing self-standing electrodes. Also provided are self-standing electrodes comprising a mixture of nanotubes and electrode active materials. In one embodiment, a self-standing electrode is prepared by first providing a liquid dispersion containing carbon nanotubes (or carbon fibers) and a separate liquid dispersion containing electrode active material, and wet-depositing electrode active material to a moving porous substrate, followed by wet-depositing carbon nanotubes or carbon fibers to the electrode active material layer on the porous substrate. The resulting composite of the electrode active material and the carbon nanotubes, such as single-walled and multi-walled nanotubes, can be removed or peeled from the porous substrate to form a self-standing electrode. The substrate can be made of any type of filter materials or mixtures thereof. Examples of substrate materials include cellulose, cloth, and any type of materials, which allow for the collection of solids and the solution/filtrate to pass though.

In one embodiment, a self-standing electrode is prepared by providing a liquid dispersion containing both carbon nanotubes (or carbon fibers) and an electrode active material, and wet-depositing the combined liquid dispersion onto a moving porous substrate. The resulting composite of the electrode active material and the carbon nanotubes, such as single-walled and multi-walled nanotubes, can be removed or peeled from the substrate to form a self-standing electrode.

In another embodiment, a self-standing electrode is prepared by first providing a liquid dispersion containing carbon nanotubes (or carbon fibers) and a separate liquid dispersion containing electrode active material, and wet-depositing carbon nanotubes or carbon fibers and electrode active material simultaneously to a moving porous substrate. The resulting composite of the electrode active material and the carbon nanotubes, such as single-walled and multi-walled nanotubes, can be removed or peeled from the substrate to form a self-standing electrode.

The present disclosure is directed to methods for the production of self-standing electrodes for Li-ion batteries using a liquid process to deposit carbon nanotubes (or carbon fibers) and electrode active materials on a moving porous substrate. Carbon nanotubes, such as single-walled and multi-walled nanotubes, from the synthesis reactor are collected and dispersed into liquid media to form a nanotube suspension or dispersion. The resulting liquid nanotube suspension/dispersion is directly deposited from the container onto a porous flexible substrate that is attached to a roll-to-roll system.

The resulting deposited layer contains well dispersed nanotubes in an active electrode material. Independent control of the nanotube and active material deposition rate allows adjustment of the ratio of nanotube to active material (weight %). The thickness of the composite obtained can be controlled, for example by varying the substrate motion speed for a given deposition rate. The thickness of the composite can be also controlled, for example, by varying deposition time and by varying nanotube/active material ratio. The electrical and mechanical properties, which are associated with the thickness of composite, can be controlled in the same manners. The composite can be removed from the porous substrate, and the layer is self-supporting, flexible, and can be cut to any desirable size. The composite can be used as an electrode without any additional binder or collector (alumina or copper, depending on the electrode type). The exploitation of this electrode opens the opportunity to increase the energy and power densities of batteries. In addition, using decoupled sources for nanotube and active material powder deposition, as well as implementing a roll-to-roll system, may allow for control over nanotube loading (weight %) and composite thickness. Moreover, the method of the present disclosure can be run continuously, and may provide cost efficiency.

In addition, the above methods are not only suitable for producing and wet-depositing single-walled carbon nanotubes, but also suitable for producing and wet-depositing multi-walled carbon nanotubes or carbon fibers. Systems suitable for wet-depositing carbon nanotubes or carbon fibers to porous substrate comprise roll-to-roll system, batch to batch system (i.e. non-moving substrate), and semi-continuous (semi-moving) system. The wet-deposited porous substrate in the above methods may optionally be washed and dried. In one embodiment, the drying temperature for the washed porous substrate is about 110° C.

Suitable materials for preparing above liquid dispersions include at least carbon nanotubes and carbon fibers. Furthermore, the carbon nanotubes include single-walled, multi-walled nanotubes, or a mixture thereof.

As used herein, "electrode active material" refers to the conductive material in an electrode. The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species.

Figure 4:
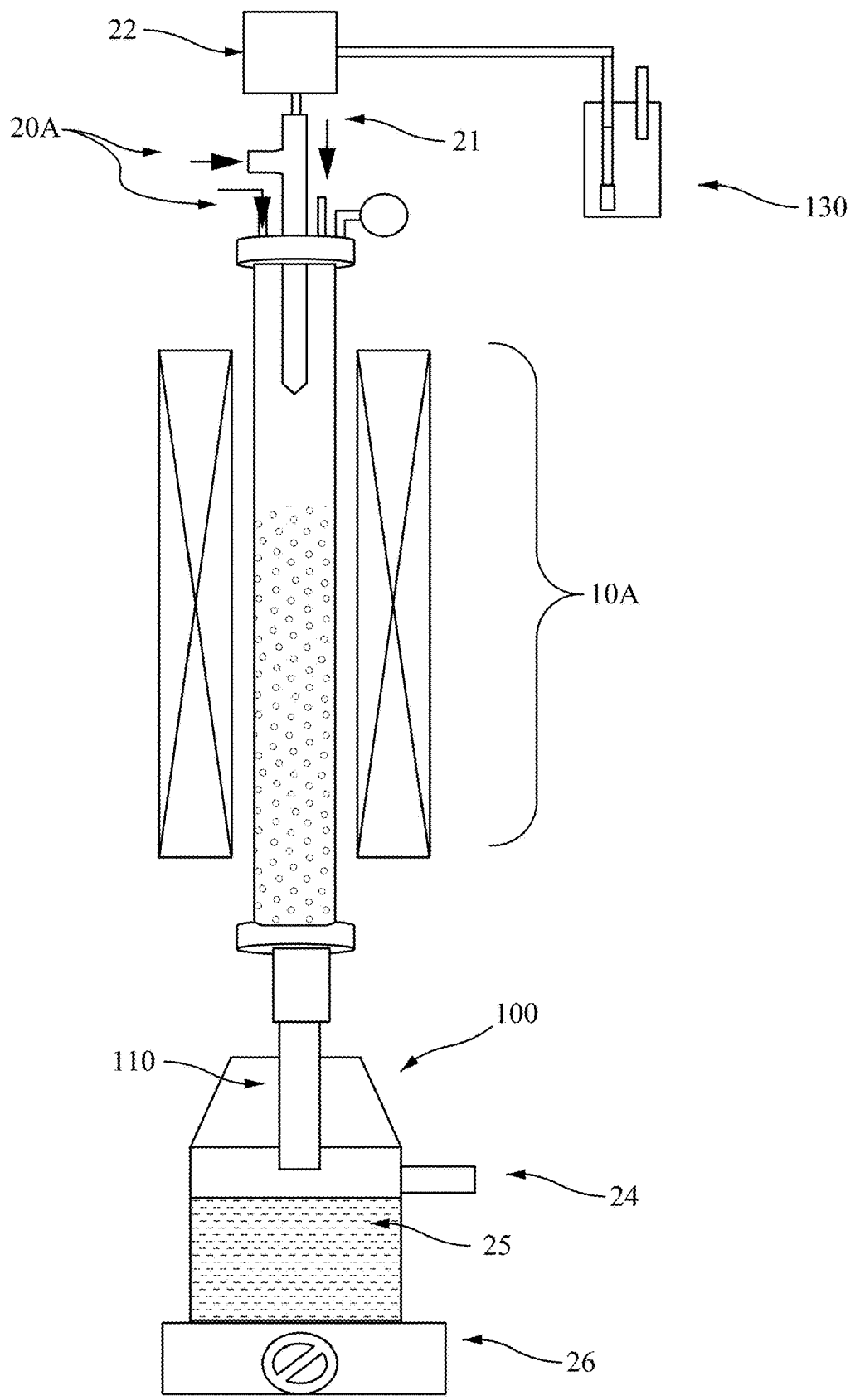
FIG. 4 illustrates an exemplary carbon nanotube synthesis reactor coupled with a collector.

FIG. 4 shows a carbon nanotube reactor 10A coupled with a collector 100 for producing a liquid carbon nanotubes dispersion. It is to be understood that the configuration of the carbon nanotube synthesis reactor is not intended to be limited in any way. As shown in FIG. 4, the nanotubes may be synthesized in the reactor 10A. For example, a carbon source or carbon precursor 130 along with catalyst may be pumped by pump 22 into the reactor 10A in the presence of one or more carrier gases 20A and 21 to form carbon nanotubes. For example, a flow of carrier gas comprising hydrogen 20A and 21 and argon 21 is introduced to the reactor 10A to blend with carbon source or carbon precursor. Hydrogen can be also used as nanotube growth promoter. In one example, the carbon nanotubes, such as single-walled and multi-walled nanotubes, can be synthesized by using thermal decomposition of metal catalyst precursor in the tube-like reactor 10A, using hydrocarbon (or $CO_x$) as carbon source, and using thiophene and hydrogen gas as nanotube growth promoters and argon gas a carrier gas.

Carrier gases suitable for use with the present disclosure include, but are not limited to, argon, hydrogen, nitrogen, and combinations thereof. Carrier gases may be used at any suitable pressure and at any suitable flow rate blend with carbon source and/catalyst to form carbon nanotubes and transport the resulting nanotubes through connector 110 into collector 100. In some embodiments, the carrier gas may be argon, hydrogen, helium, or mixtures thereof. In some embodiments, the carrier gas may comprise argon at a flow rate of 850 standard cubic centimeters per minute (sccm) and hydrogen at a flow rate of 300 sccm. The flow rate of carrier gases can be varied to obtain optimal results. The reaction exhaust gas is vented out through outlet 25.

In one example, the floating carbon nanotubes, such as single-walled and multi-walled nanotubes, or carbon fibers, produced in the synthesis reactor 10A enter the collector 100 through a connector/nozzle 110 and are collected in a liquid medium 25. The liquid medium and collected carbon nanotubes can be stirred and mixed within the collector 100. The reaction exhaust gas is vented out of the collector through an outlet 24. The liquid medium 25 may be stirred by a mixer 26. The liquid medium 25 comprises, for example, a solvent or a solvent mixture to capture the floating carbon nanotubes. Suitable solvents for preparing a liquid medium include, but not limited to, water, ethanol, alcohol, NMH solvent, and mixtures thereof. The liquid medium may optionally comprise a small amount of surfactant, such as sodium dodecyl sulfate (SDS), cetyltrimethylammonium bromide (CTAB), and surfactants containing aromatic substrates such as pyrene or perylene, as well as aliphatic chains, or mixtures thereof. The surfactant in the liquid medium can prevent the captured carbon nanotubes from bundling. The small amount of surfactant in the liquid medium does not require a separate purification step in the following process to produce self-standing electrode and the existence of the small amount of surfactant does not alter the performance of the final product. As a result, a liquid medium having carbon nanotubes uniformly dispersed therein is produced.

The collector 100 containing the liquid dispersion of carbon nanotubes along with the connector/nozzle 110 is decoupled or removed from the synthesis reactor 10A. The liquid dispersion obtained in the previous steps does not need further processing and is directly used for spraying (wet-depositing) onto a moving porous substrate. In the process, the collector is reversed in position directing the nozzle 110 towards the moving substrate such that the same nozzle 110 used for collecting floating carbon nanotubes during synthesis is also used for wet-depositing. The entire process does not require additional device or additional processing. Alternatively, the liquid dispersion can be pumped from the collector for deposition on the substrate, or the entire dispersion can be transferred to a separate wet-deposition storage and dispensing tank. Utilizing such a separate wet-deposition storage and dispensing tank allows multiple reactors and collectors to be used to facilitate more continuous production of the self-standing electrodes. The content or liquid dispersions transferred from different collectors to the dispensing tanks may be further stirred and mixed in the dispensing tanks to achieve better uniformity in the wet-depositing step.

The synthesis of carbon nanotubes according to the present disclosure can be continuous and uninterrupted because the decoupled collector containing liquid dispersion of carbon nanotubes can be replaced by a new collector containing the same liquid medium ready to collect floating carbon nanotubes from synthesis reactor.

Solvents used in the liquid dispersion according to the present disclosure may be removed by evaporation. The evaporation conditions depend on the nature of solvents. For examples, alcohol can be evaporated quickly with a temperature close to room temperature, whereas NMH needs much higher temperature, e.g. 110° C., for prolonged period of time to evaporate.

The wet-depositing speed can be controlled to achieve the desired composite of carbon nanotube and electrode active materials. The wet-depositing speed is from 0.2 mg to 20 mg carbon nanotube per minute. In one embodiment, the speed of wet-depositing carbon-nanotubes according to the present disclosure is about 1 mg nanotube per minute.

The type of nanotubes used in the present disclosure are not limited. The nanotubes may be entirely carbon, or they made be substituted, that is, have non-carbon lattice atoms. Carbon nanotubes may be externally derivatized to include one or more functional moieties at a side and/or an end location. In some embodiments, carbon and inorganic nanotubes include additional components such as metals or metalloids, incorporated into the structure of the nanotube. In certain embodiments, the additional components are a dopant, a surface coating, or are a combination thereof.

Nanotubes may be metallic, semimetallic, or semi-conducting depending on their chirality. A carbon nanotube's chirality is indicated by the double index (n,m), where n and m are integers that describe the cut and wrapping of hexagonal graphite when formed into a tubular structure, as is well known in the art. A nanotube of an (m,n) configuration is insulating. A nanotube of an (n,n), or "armchair", configuration is metallic, and hence highly valued for its electric and thermal conductivity. Carbon nanotubes may have diameters ranging from about 0.6 nm for single-wall carbon nanotubes up to 20 nm or greater for single-wall or multi-wall nanotubes. The nanotubes may range in length from about 50 nm to about 1 cm or greater.

In another example, carbon fibers can be produced using the same synthesis reactor 10A. The method of producing a liquid suspension/dispersion of carbon fibers is generally the same as that of carbon nanotubes. Carbon fibers may have diameters ranging from about 100 nm to about several millimeters. Preferably, the diameters of carbon fibers range from about 100 nm to several hundred μm (micrometers).

In a non-limiting example, the electrode active material may be any solid, metal oxide powder that is capable of being dispersed in liquid media. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide ($LiNiMnCoO_2$). The metal oxide powders can have a particle size defined within a range between about 1 nanometer and about 100 microns. In a non-limiting example, the metal oxide particles have an average particle size of about 1 nanometer to about 10 nanometers.

Metals in lithium metal oxides according to the present disclosure may include but are not limited to one or more alkali metals, alkaline earth metals, transition metals, aluminum, or post-transition metals, and hydrates thereof. In some embodiments, the electrode active material is lithium nickel manganese cobalt oxide ($LiNiMnCoO_2$).

Figure 5:
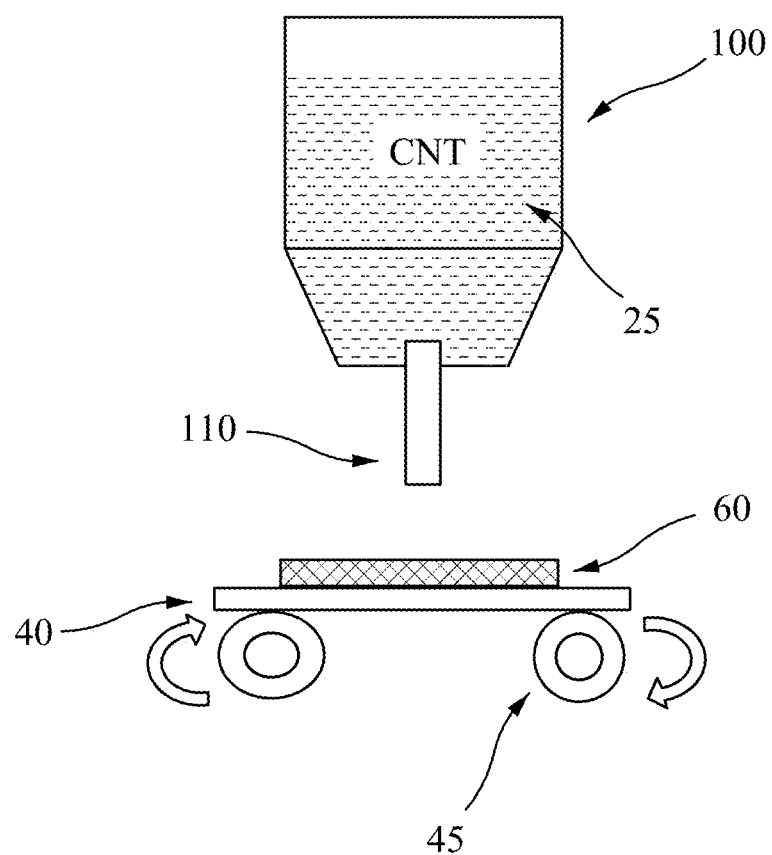
FIG. 5 shows an exemplary method for wet-depositing carbon nanotubes from a liquid dispersion in a collector to a porous substrate (methods I).

In a non-limiting example as shown in FIG. 1 and FIG. 5, self-standing electrodes for Li-ion batteries are prepared by separately providing a carbon nanotube liquid dispersion and an electrode active material liquid dispersion. In the example, the electrode active material is lithium nickel manganese cobalt oxide (Li.Ni.Mn.Co.Oxide or $LiNiMnCoO_2$). The liquid dispersions of the two materials are prepared in two separate liquid media at step S110. The liquid dispersions may be mixed or stirred separately in the two collectors. The liquid dispersion of electrode active materials is sprayed/wet-deposited to a porous substrate followed by wet-depositing the carbon nanotube dispersion to the same substrate (S120-S130) to form a composite self-standing electrode having a desired thickness thereon that comprises the mixed carbon nanotubes and the electrode active materials.

Optionally, the self-standing electrode can be treated at step S140, for example, by pressing and casting, to increase the density of the self-standing electrode. The self-standing electrode is self-supported, flexible, and can optionally be cut to the desired dimensions of a battery electrode. The self-standing electrode is optionally free of binder and optionally can be used without a metal-based current collector (typically alumina or copper depending on the electrode type).

Figure 2:
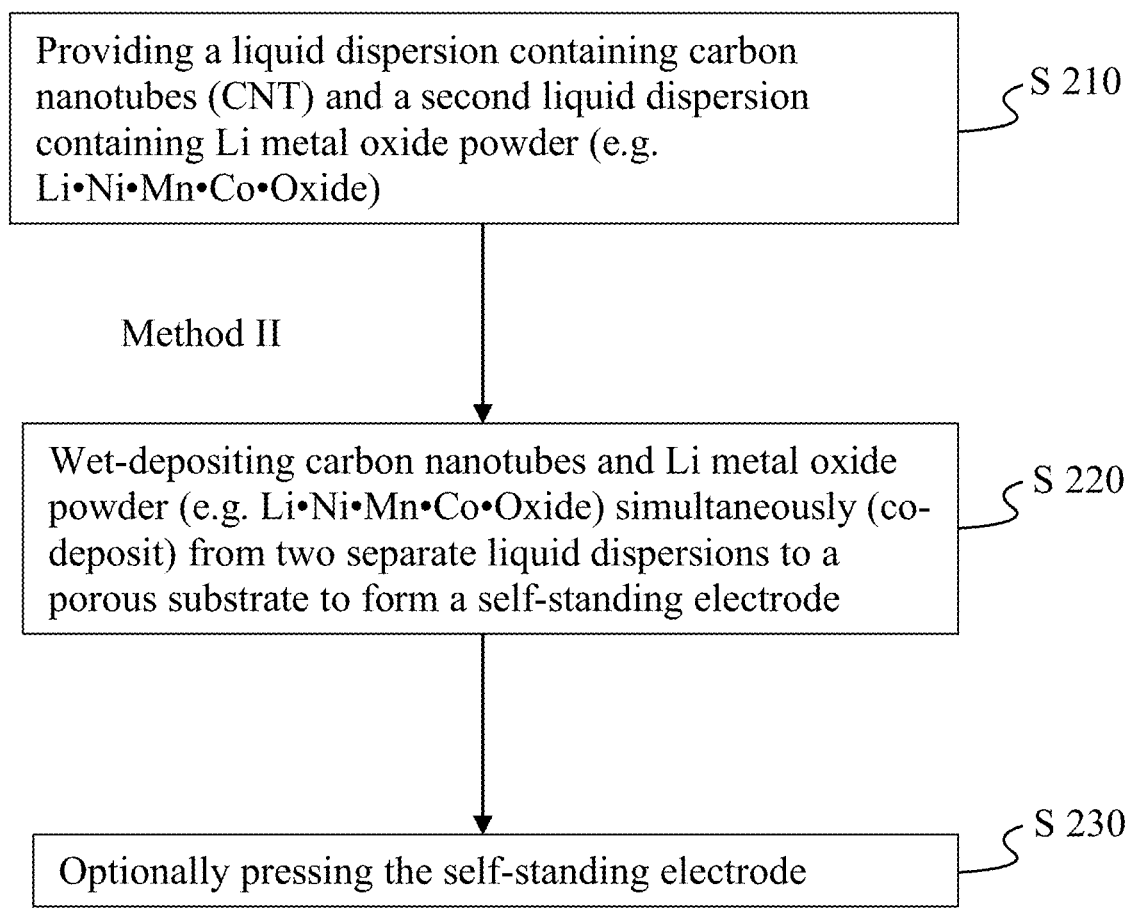
FIG. 2 is a flow block diagram illustrating an exemplary method (method II) for making a self-standing electrode.
Figure 6:
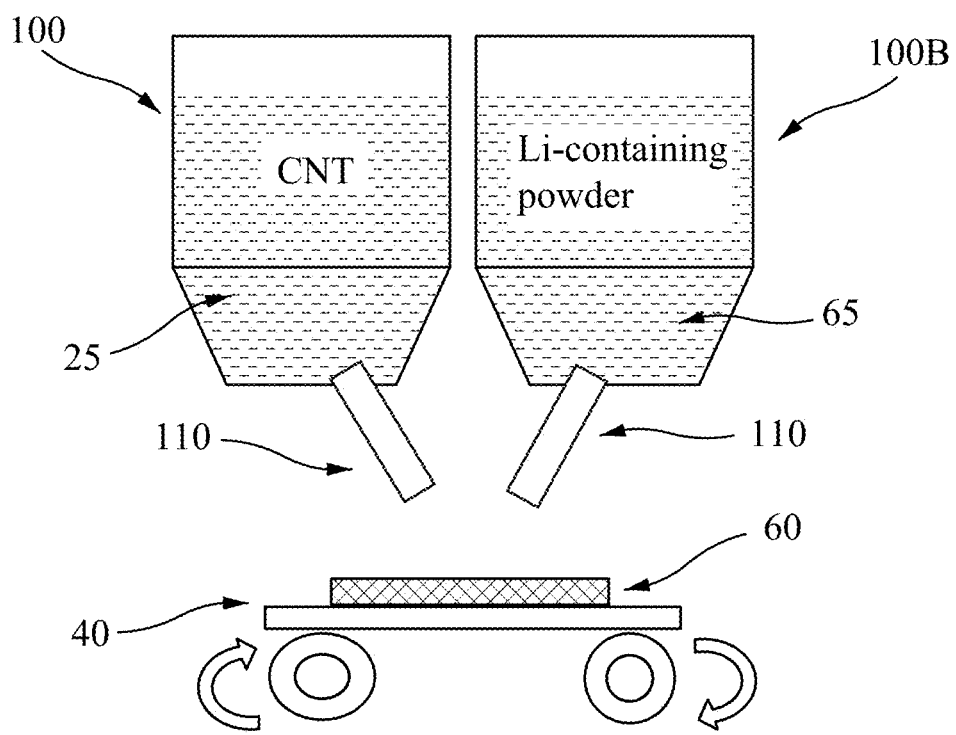
FIG. 6 shows an exemplary method for co-depositing carbon nanotubes and electrode active material from two separate liquid dispersions to a porous substrate (method II).

In a non-limiting example as shown in FIG. 2 and FIG. 6, self-standing electrodes for Li-ion batteries are prepared by separately providing a liquid carbon nanotube dispersion and a liquid electrode active material dispersion. The liquid dispersions in the collectors (100 and 100B of FIG. 6) can be stirred and mixed separately. In the example, the electrode active material is $LiNiMnCoO_2$. The liquid dispersions of the two materials are prepared in two separate liquid media (25 and 65 of FIG. 6) at step S210 of FIG. 2. The liquid dispersion of carbon nanotubes and the liquid dispersion of electrode active materials are sprayed simultaneous (co-deposited) through two nozzles (110 of FIG. 6) to a porous substrate (60 of FIG. 6) to form a composite self-standing electrode having a desired thickness thereon that comprises the mixed carbon nanotubes and the electrode active materials. Alternatively, the two separate liquid dispersions may be premixed before wet-depositing to the porous substrate. The premixing of the two liquid dispersions can be achieved by feeding the dispersions through mixing devices, such as T or Y shape joints/tubes or in-line mixers. Examples of commercial available models of in-line mixers include Koflo® static inline mixers.

Optionally, the self-standing electrode can be treated at step S230, for example, by pressing and casting, to increase the density of the self-standing electrode. The self-standing electrode is self-supported, flexible, and can optionally be cut to the desired dimensions of a battery electrode. The self-standing electrode is optionally free of binder and optionally can be used without a metal-based current collector (typically alumina or copper depending on the electrode type).

Figure 3:
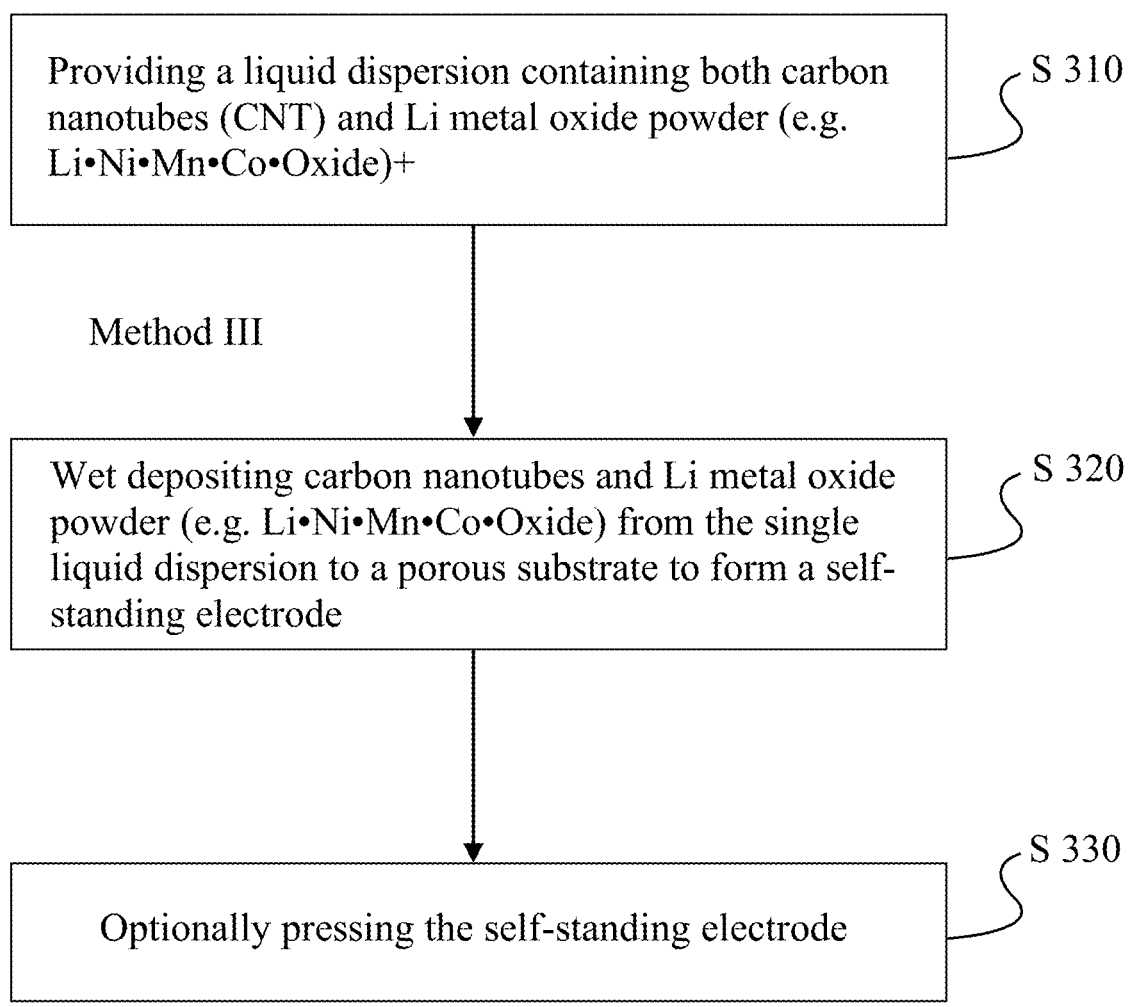
FIG. 3 is a flow block diagram illustrating an exemplary method (method III) for making a self-standing electrode.
Figure 7:
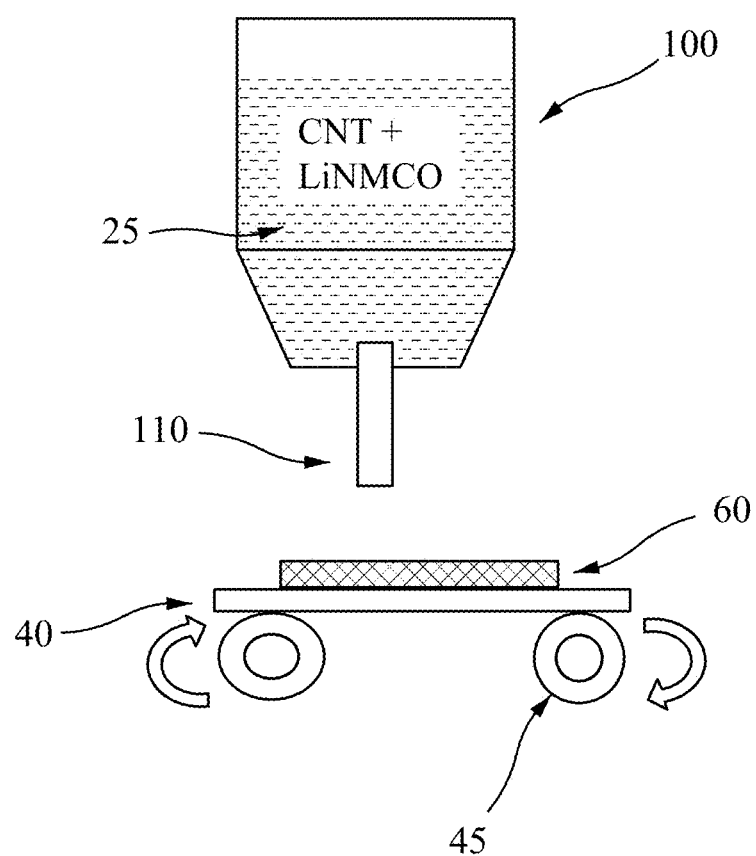
FIG. 7 shows an exemplary method for wet-depositing carbon nanotubes and electrode active material simultaneously from a single liquid dispersion to a porous substrate (method III).

In a non-limiting example as shown in FIG. 3 and FIG. 7, self-standing electrodes for Li-ion batteries are prepared by providing a single liquid dispersion containing both carbon nanotubes and electrode active materials. In the example, the electrode active material is LiNiMnCoO$_2$. The single liquid dispersion containing both nanotubes and LiNiMnCoO$_2$ is prepared in a liquid medium (25 of FIG. 7) at step S310 of FIG. 3. The liquid dispersion may be stirred and mixed in the collector (100 of FIG. 7). The single liquid dispersion is wet-deposited through the nozzle (110 of FIG. 7) to a porous substrate (60 of FIG. 7) to form a composite self-standing electrode having a desired thickness thereon that comprises the mixed carbon nanotubes and the electrode active materials.

Optionally, the self-standing electrode can be treated at step S330, for example, by pressing and casting, to increase the density of the self-standing electrode. The self-standing electrode is self-supported, flexible, and can optionally be cut to the desired dimensions of a battery electrode. The self-standing electrode is optionally free of binder and optionally can be used without a metal-based current collector (typically alumina or copper depending on the electrode type).

The movable porous substrate may be rendered movable by any suitable means known to those of ordinary skill in the art. In some embodiments, the movable porous substrate may be a porous flexible substrate attached to a conveyor belt or a roll-to-roll system, such as roll-to-roll system 45 shown in FIGS. 5-7. The rate of motion of the movable porous substrate may be controllable, such as by a computer or manually by an operator. Control of the rate of motion may enable or facilitate control of the thickness of the composite obtained. Suitable porous flexible substrates, including but not limited to a filter or a frit, have pores appropriately sized so as to not permit passage of the composite. In some embodiments, the pores may be sized to permit passage of solvents in the liquid dispersions. One example of roll-to-roll system is horizontal belt filter system. The horizontal belt filter system uses a continuous cloth as filter (or porous) substrate that the slurry material (e.g. a carbon nanotube dispersion) can be applied to. The horizontal belt filter system pulls a vacuum to remove the filtrate and the solid slurry material deposits on the cloth to form a cake (e.g. carbon nanotube film). The horizontal belt filter system may optionally provide a step of washing the cake. One example of the commercial available horizontal belt filter systems is Outotec® Larox RT horizontal vacuum belt filter. Such commercial system may further provide zones that are used to compress and heat the slurry cakes. The horizontal belt filter systems could offer a way of forming discrete electrodes with the use of a template that can be positioned over the filter to form separate filtration zones, which actually lead to the formation of individual electrodes. Such belt filter systems could avoid losses of carbon nanotubes in the process of trimming a large blanket into individual electrodes.

In a non-limiting example, carbon nanotubes, such as single-walled and multi-walled nanotubes, or carbon fibers may be synthesized in a reactor or furnace from a carbon source or carbon precursor in the presence of a catalyst or catalyst precursor, at a temperature of about 1000 to about 1500° C., such as about 1300° C.

The present disclosure is not limited to the type or form of catalysts used for the production of carbon nanotubes. In various aspects, the catalyst particles are present as an aerosol. In some embodiments, the catalyst materials are supplied as nanoparticles, including but not limited to colloidal metallic nanoparticles, comprising a transition metal, a lanthanide metal, or an actinide metal. For example, the catalyst may comprise a Group VI transition metal such as chromium (Cr), molybdenum (Mo), and tungsten (W), or a Group VIII transition metal such as iron (Fe), cobalt (Co), nickel (Ni), ruthenium (Ru), rhodium (Rh), palladium (Pd), osmium (Os), Iridium (Ir), and platinum (Pt). In some embodiments, a combination of two or more metals are used, for example an iron, nickel, and cobalt mixture or more specifically a 50:50 mixture (by weight) of nickel and cobalt. The catalyst may comprise a pure metal, a metal oxide, a metal carbide, a nitrate salt of a metal, and/or other compounds containing one or more of the metals described herein. The catalyst may be added to the reactor at about 0.1 atom % to about 10 atom %, where atom % indicates the percentage of the number of catalyst atoms with respect to the total number of atoms in the reactor (catalyst and carbon precursor atoms).

Alternatively or in combination, a catalyst precursor may be introduced, wherein the catalyst precursor can be converted to an active catalyst under the reactor's conditions. The catalyst precursor may comprise one or more transition metal salts such as a transition metal nitrate, a transition metal acetate, a transition metal citrate, a transition metal chloride, a transition metal fluoride, a transition metal bromide, a transition metal iodide, or hydrates thereof. For example, the catalyst precursor may be a metallocene, a metal acetylacetonate, a metal phthalocyanine, a metal porphyrin, a metal salt, a metalorganic compound, or a combination thereof. For example, the catalyst precursor may be a ferrocene, nickelocene, cobaltocene, molybdenocene, ruthenocene, iron acetylacetonate, nickel acetylacetonate, cobalt acetylacetonate, molybdenum acetylacetonate, ruthenium acetylacetonate, iron phthalocyanine, nickel phthalocyanine, cobalt phthalocyanine, iron porphyrin, nickel porphyrin, cobalt porphyrin, an iron salt, a nickel salt, cobalt salt, molybdenum salt, ruthenium salt, or a combination thereof. The catalyst precursor may comprise a soluble salt such as $Fe(NO_3)_3$, $Ni(NO_3)_2$ or $Co(NO_3)_2$ dissolved in a liquid such as water. The catalyst precursor may achieve an intermediate catalyst state in the catalyst particle growth zone of the reactor, and subsequently become converted to an active catalyst upon exposure to the nanostructure growth conditions in the nanostructure growth zone of the reactor. For example, the catalyst precursor may be a transition metal salt that is converted into a transition metal oxide in the catalyst particle growth zone, then converted into active catalytic nanoparticles in the nanostructure growth zone.

The catalyst particles may comprise a transition metal, such as a d-block transition metal, an f-block transition metal, or a combination thereof. For example, the catalyst particles may comprise a d-block transition metal such as an iron, nickel, cobalt, gold, silver, or a combination thereof. The catalyst particles may be supported on a catalyst support, wherein the catalyst support may be selected from alumina, silica, zirconia, magnesia, or zeolites. For example, the catalyst support may be a nanoporous magnesium oxide support. The catalyst support may be the same or different from the material selected for the matrix. In order to have catalyst particles on a catalyst support, the catalyst support material may be introduced into the catalyst material prior to adding the catalyst to the reactor. For example, a solution of the catalyst material, such as a molybdenum/cobalt mixture, may be combined with a solution of magnesium nitrate, heated together, and then cooled to produce a catalyst on a nanoporous MgO support. Alternately, a silica support may be impregnated with cobalt nitrate and ammonium heptamolybdate and dried for several hours to produce a cobalt/molybdenum catalyst on a porous silica support.

The present disclosure is not limited to the type of carbon precursors or carbon sources used to form carbon nanotubes such as one or more carbon-containing gases, one or more hydrocarbon solvents, and mixtures thereof. Examples of carbon precursors include, but are not limited to hydrocarbon gases, such as methane, acetylene, and ethylene; alcohols, such as ethanol and methanol; benzene; toluene; CO; and $CO_2$. A fuel for carbon nanotube synthesis and growth comprises a mixture of one or more carbon precursors or carbon sources and one or more catalysts or catalyst precursors.

The fuel or precursor may be injected at a range of about 0.05 to about 1 ml/min, such as about 0.1 ml/min or about 0.3 ml/min, per injector. In some embodiments, more than one injector may be used, for example at large scale. The gas flow rate may be about 0.1 to about 5 L/min of hydrogen and/or about 0.2 to about 2 L/min helium or argon, such as about 5 L/min hydrogen, or about 0.3 L/min hydrogen and about 1 L/min argon. The range of flow rate may vary ±10% from the above described values. Without wishing to be bound to any particular theory, helium or argon may be included in the carrier gas to dilute the hydrogen concentration, for example to keep the hydrogen concentration below the explosive limit. Selection of a fuel injection rate and/or a gas flow rate may depend, for example, on the reactor volume, as will be apparent to those of ordinary skill in the art. In some embodiments, more than one reactor may be used in conjunction. In some embodiments, the reactor temperature profile consists of a starting low temperature, an increase to a peak or a maximum, and then a decrease, for example, to the starting low temperature. Without wishing to be bound by any particular theory, for a given reactor temperature profile, the injector position inside the reactor should be correlated with the precursor temperature so that the precursor evaporates from the point of injection, without droplet formation or decomposition, as can be determined by those of ordinary skill in the art, considering for example the boiling point and decomposition. In some embodiments, the injector tip may be inserted into the reactor, for example, by about 8 inches. The injection temperature, at the tip of the injector, may depend on the reactor or furnace temperature and upon the depth of insertion of the injector into the reactor or furnace. The injection temperature at the tip of the injector is from about 650° C. to about 780° C. In some embodiments, the injection temperature at the tip of the injector is about 750° C. In some embodiments, the injector tip is inserted about 8 inches inside the reactor. The carbon nanotube reactor may be run for any suitable length of time to obtain the product composition and thickness desired, as can be determined by those of ordinary skill in the art, for example as long as there are starting materials.

Figure 8:
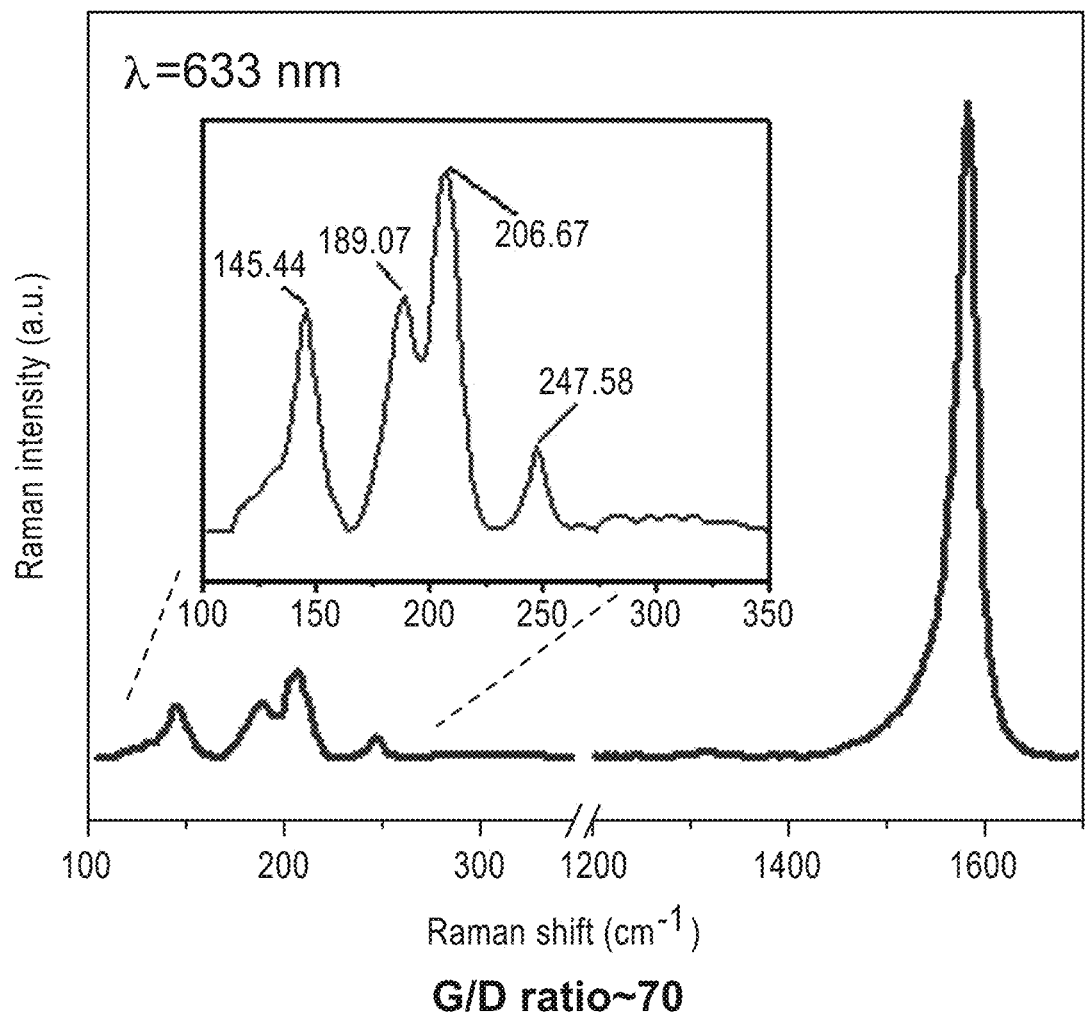
FIG. 8 illustrates an exemplary Raman characterization of carbon nanotubes synthesized according to the present disclosure.
Figure 9:
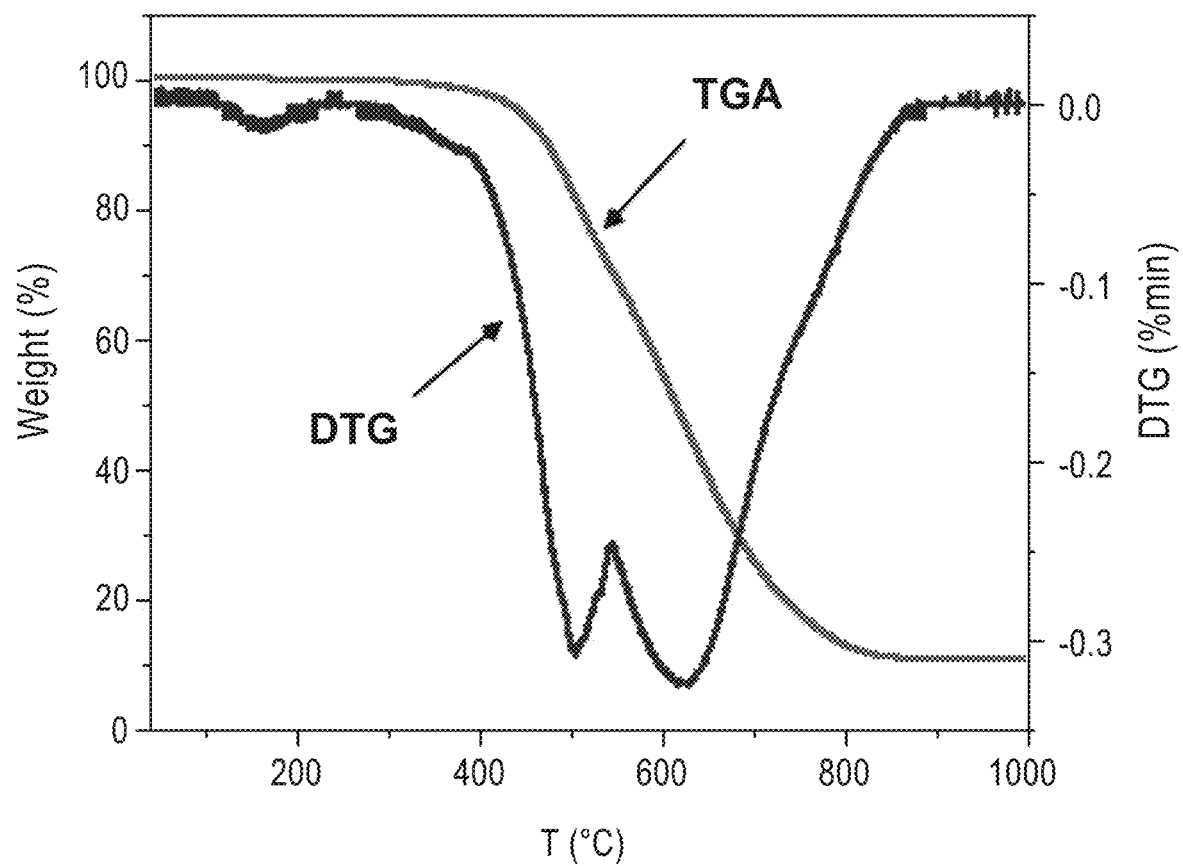
FIG. 9 depicts an exemplary derivative thermogravimetric analysis (DTG) and thermal gravimetric analysis (TGA) of carbon nanotubes synthesized according to the present disclosure.

Carbon nanotubes synthesized according to the present disclosure may be characterized using any suitable means known in the art, including but not limited to derivative thermogravimetric analysis (DTG) and Raman spectroscopy, such as for calculation of the G/D ratio, as is disclosed in U.S. Patent Application Publication No. 2009/0274609. The Raman spectra of SWNTs has three major peaks, which are the G-band at about 1590 $cm^{-1}$, D-band at about 1350 $cm^{-1}$, and the Radial breathing mode (RBM) at about 100-300 $cm^{-1}$. RBM frequency is proportional to an inverse of the diameter of SWNTs and can thus be used to calculate the diameter of the SWNT. Normally, a red shift in RBM peak corresponds to an increase in the mean diameter of SWNTs. The tangential mode G-band related to the Raman-allowed phonon mode E2g can be a superposition of two peaks. The double peak at about 1593 and 1568 $cm^{-1}$ has been assigned to semiconductor SWNTs, while the broad Breit-Wigner-Fano line at about 1550 $cm^{-1}$ has been assigned to metallic SWNTs. Thus, G-band offers a method for distinguishing between metallic and semiconducting SWNTs. The D-band structure is related to disordered carbon, the presence of amorphous carbon, and other defects due to the $sp^2$-carbon network. The ratio of the G-band to D-band in the Raman spectra (IG:ID or G/D ratio) of SWNTs can be used as an index to determine the purity and quality of the SWNTs produced. Preferably, IG:ID is about 1 to about 500, preferably about 5 to about 400, more preferably greater than about 7. Representative, non-limiting examples of Raman characterization of carbon nanotubes synthesized according to the present disclosure are shown in FIG. 8. A representative, non-limiting example of DTG and thermal gravimetric analysis (TGA) of carbon nanotubes synthesized according to the present disclosure is shown in FIG. 9.

As used herein, "co-depositing" of two or more substances refers to the simultaneous deposition of two or more substances, which were not previously in contact with one another. Co-depositing may be carried out by any suitable means known to those in the art, including but not limited to chemical vapor deposition. Co-depositing may be carried out in a fume hood or with other suitable apparatus, as will be known to those of ordinary skill in the art. In some embodiments, the carbon nanotubes and the electrode active material do not contact each other until they are co-deposited onto the substrate.

Collecting the mixture of single-walled carbon nanotubes and removing the carrier gas may be carried out by any suitable means. The collecting surface of the porous substrate 60 may be a porous surface, including but not limited to a filter or a frit, where the pores are appropriately sized to retain the mixture of carbon nanotubes and the electrode active material thereon to form the self-standing electrode while permitting passage or evaporation of solvents in the liquid dispersions. The carrier may be removed after passing through the reactor and by way of an outlet. In some embodiments, removal of the carrier gas may be facilitated by a vacuum source. With respect to filters, the filters may be in the form of a sheet and may comprise a variety of different materials including woven and non-woven fabrics. Illustrative filter materials include, but are not limited to, cotton, polyolefins, nylons, acrylics, polyesters, fiberglass, and polytetrafluoroethylene (PTFE).

In some embodiments, the method further comprises synthesizing the single-walled carbon nanotubes in a carbon nanotube synthesis reactor. The reactor may comprise a catalyst or catalyst precursor, a carbon source, one or more gas inlets, one or more outlets, and a carbon nanotube growth zone. The one or more gas inlets may be configured to let in one or more carrier gases.

In some embodiments, the carbon nanotube synthesis reactor may include a quartz tube of 25 mm OD×22 mm ID×760 mm length and may be operated at atmospheric pressure. Alternatively, the carbon nanotube synthesis reactor may be designed as described in U.S. patent application Ser. No. 15/452,509, filed Mar. 7, 2017, and Ser. No. 15/452,500, filed Mar. 7, 2017. The carbon nanotube synthesis reactor may be arranged at a variety of angles with respect to the other equipment.

In some embodiments, the electrode active material is selected from graphite, hard carbon, lithium metal oxides, lithium iron phosphate, and metal oxides. In some embodiments, the electrode active material for the anode may be graphite or hard carbon. In some embodiments, the electrode active material for the cathode may be lithium metal oxide or lithium iron phosphate.

Alternatively, the electrode active material may be selected from electrode active materials described in U.S. patent application Ser. No. 15/452,509, filed Mar. 7, 2017, and Ser. No. 15/452,500, filed Mar. 7, 2017.

In a non-limiting example, the electrode active material may be any solid, metal oxide powder that is capable of being dispersed in liquid media. In an illustrative example, the metal oxide is a material for use in the cathode of the battery. Non-limiting examples of metal oxides include oxides of Ni, Mn, Co, Al, Mg, Ti and any mixture thereof. The metal oxide may be lithiated. In an illustrative example, the metal oxide is lithium nickel manganese cobalt oxide (LiNiMnCoO2). The metal oxide powders can have a particle size defined within a range between about 1 nanometer and about 100 microns. In a non-limiting example, the metal oxide particles have an average particle size of about 1 nanometer to about 10 nanometers.

Metals in lithium metal oxides according to the present disclosure may include but are not limited to one or more alkali metals, alkaline earth metals, transition metals, aluminum, or post-transition metals, and hydrates thereof. In some embodiments, the electrode active material is lithium nickel manganese cobalt oxide (LiNiMnCoO$_2$).

"Alkali metals" are metals in Group I of the periodic table of the elements, such as lithium, sodium, potassium, rubidium, cesium, or francium.

"Alkaline earth metals" are metals in Group II of the periodic table of the elements, such as beryllium, magnesium, calcium, strontium, barium, or radium.

"Transition metals" are metals in the d-block of the periodic table of the elements, including the lanthanide and actinide series. Transition metals include, but are not limited to, scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metals" include, but are not limited to, aluminum, gallium, indium, tin, thallium, lead, bismuth, or polonium.

The loading or weight % of carbon nanotubes in the composite self-standing electrode product is based on the relative amounts of the nanotubes (or carbon source used to form the nanotubes) and the electrode active material. It is within the level of ordinary skill in the art to determine the relative starting amounts of carbon source, catalyst/catalyst precursor, and electrode active material that will afford a given loading or weight % of carbon nanotubes in the composite self-standing electrode product. In a non-limiting example, the self-standing electrode may comprise from 0.1% to 4% by weight carbon nanotubes, and the balance the electrode active material and optionally one or more additives. Optionally, the self-standing electrode may comprise from 0.2% to 3% by weight carbon nanotubes, and the balance the electrode active material and optionally one or more additives. Optionally, the self-standing electrode may comprise from 0.75% to 2% by weight carbon nanotubes, and the balance the electrode active material and optionally one or more additives. Additives and/or dopants may be present for each range in an amount of 0 to 5% by weight. In a non-limiting example, the self-standing electrode consists essentially of the carbon nanotubes and the electrode active material powder. In a non-limiting example, the self-standing electrode consists of the carbon nanotubes and the electrode active material powder. For each of the ranges, the self-standing electrode may be free of any binders. The lack of a binder results in a self-standing electrode with improved flexibility. Further, it has been discovered that a higher carbon nanotube content increases the flexibility of the self-standing electrode. Without being bound to any particular theory, this is likely due to the webbed morphology of the self-standing electrode in which there is a webbed arrangement of carbon nanotubes with the electrode active material contained or embedded within the web.

In a non-limiting example, the self-standing electrode may comprise a density of 0.9 to 1.75 g/cc. Optionally, the self-standing electrode may comprise a density of 0.95 to 1.25 g/cc. Optionally, the self-standing electrode may comprise a density of 0.75 to 2.0 g/cc. Optionally, the self-standing electrode may comprise a density of 0.95 to 1.60 g/cc.

In a non-limiting example, the self-standing electrode may comprise a thickness of up to 750 μm following collection on the porous substrate. Optionally, the self-standing electrode may comprise a thickness of 50 μm to 500 μm following collection on the porous substrate. Optionally, the self-standing electrode may comprise a thickness of from 100 μm to 450 μm following collection on the porous substrate. Optionally, the self-standing electrode may comprise a thickness of from 175 μm to 250 μm following collection on the porous substrate.

In some embodiments, the method of the present disclosure may further comprise treating the composite or self-standing electrode, including but not limited to pressing the composite or self-standing electrode. Without wishing to be bound to any particular theory, pressing may increase the density and/or lower the thickness of the self-standing electrode, which may improve such properties as rate performance, energy density, and battery life. Pressing of the self-standing electrodes may be carried out by applying a force to achieve a desired thickness and/or density, such as by using a rolling press or calendaring machine, platen press, or other suitable means, as will be known to those of ordinary skill in the art. Any suitable force may be applied, to achieve a desired thickness, and/or density, and/or impedance, such as but not limited to a force of about 1 ton, about 2 tons, about 3 tons, about 4 tons, about 5 tons, about 6 tons, about 7 tons, about 8 tons, about 9 tons, about 10 tons, about 15 tons, or any integer or range in between, such as between about 7 tons and about 10 tons. In some embodiments, pressing may be limited to pressing to a thickness of about 20 microns, about 30 microns, about 40 microns, about 50 microns, about 60 microns, about 70 microns, about 80 microns, about 90 microns, about 100 microns, about 150 microns, about 200 microns, about 250 microns, about 300 microns, about 350 microns, about 400 microns, or any integer or range in between. Without wishing to be bound by any particular theory, too thick of an electrode may be slow to produce energy or may not be suitably flexible. In some embodiments, it may be desirable to obtain an electrode foil that is flexible without formation of oxide or cracks. If the electrode is too thin, energy production may be rapid but it may be the case that not enough energy is produced. In addition, it may be desirable to regulate the distance between the rolls or rollers in a rolling press or calendaring machine, or between the plates of a platen press, by any suitable means known to those of ordinary skill in the art.

Determination of a suitable amount of pressing is within the level of ordinary skill in the art. As will be known to those of ordinary skill in the art, excessive pressing may cause the electrolyte to penetrate the electrode too much, as determined by measuring impedance and/or resistance to diffusion. As will be evident to those of ordinary skill in the art, it may be of interest to minimize the electrolyte diffusion resistance or coefficient for a given electrolyte, as measured by impedance. In a non-limiting example, the thickness of the self-standing electrode following pressing may be from 40% to 75% of the thickness of the untreated self-standing electrode, or the self-standing electrode following collection on the porous substrate. Optionally, the thickness of the self-standing electrode following pressing may be from 45% to 60% of the thickness of the untreated self-standing electrode, or the self-standing electrode following collection on the porous substrate.

In a non-limiting example, the density of the self-standing electrode following pressing is increased by 40% to 125% of the density of the untreated self-standing electrode, or the self-standing electrode following collection on the porous substrate. Optionally, the density of the self-standing electrode following pressing is increased by 45% to 90% of the density of the untreated self-standing electrode, or the self-standing electrode following collection on the porous substrate.

Electrodes pressed to thinner thicknesses may be unsuitably brittle. Non-limiting examples of electrode thickness and density, with and without pressing, are shown in the table below:

| Sample No. | Weight (mg) | Single-walled nanotube loading | Original thickness (μm) | Original density (g/cc) | Thickness after pressing (mm) | Pressed density (g/cc) |
| --- | --- | --- | --- | --- | --- | --- |
| 1 | 417 | 1.2 | 125 | 1.20 | unknown | unknown |
| 2 | 612 | 1.1 | 200 | 1.11 | unknown | unknown |
| 3 | 572 | 1.1 | 200 | 1.03 | unknown | unknown |
| 4 | 293 | 0.46 | 196 | 1.25 | 112 | 2.14 |
| 5 | 265 | 0.73 | 211 | 1.05 | 148 | 1.49 |
| 6 | 339 | 0.41 | 244 | 1.16 | 128 | 2.20 |
| 7 | 811 | 0.21 | 434 | 1.56 | 220 | 2.28 |
| 8 | 266 | 0.63 | 231 | 0.96 | 109 | 2.03 |

In some embodiments, the carbon nanotube synthesis reactor comprises one or more gas inlets, one or more gas outlets, and a carbon nanotube growth zone where a catalyst or catalyst precursor and a carbon source are used to grow the carbon nanotubes.

In some embodiments, the movable porous flexible substrate 60 is connected to a roll-to-roll system 40 and 45.

In some embodiments, the present disclosure is directed to a self-standing electrode, comprising a composite of an electrode active material and single-walled carbon nanotubes; wherein the self-standing electrode does not contain binder material or a metal-based current collector material.

In some embodiments, the electrode is characterized by a webbed morphology or a net. In some embodiments, a webbed morphology or a net is a webbed arrangement of carbon nanotubes with the electrode active material contained or embedded within the carbon nanotube web or net.

Composites or self-standing electrodes prepared according to the present disclosure may be of any desired thickness and may be cut according to requirements. Thickness may be controlled by factors including, but not limited to, the rate of motion of the movable substrate, the rate of deposition of the carbon nanotubes and/or the electrode active material, and the carbon nanotube loading (weight %).

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Moreover, all references throughout this application, for example patent documents including issued or granted patents or equivalents; patent application publications; and non-patent literature documents or other source material; are hereby incorporated by reference herein in their entireties, as though individually incorporated by reference.

What is claimed is:

1. A method of making a self-standing electrode, the method comprising:
   providing a liquid dispersion comprising carbon nanotubes or carbon fibers, and a liquid medium;
   wet-depositing the carbon nanotubes or the carbon fibers from the liquid dispersion to a moving substrate, which is pre-deposited with an electrode active material, to form a composite comprising both the carbon nanotubes or the carbon fibers and the electrode active material; and
   removing the composite from the substrate to form a self-standing electrode, wherein the electrode active material is not mixed with carbon nanotubes or carbon fibers prior to wet-depositing the carbon nanotubes or the carbon fibers from the liquid dispersion to the moving substrate.

2. The method of claim 1, further comprising compressing the composite.

3. The method of claim 1, wherein the carbon nanotubes are selected from single-walled carbon nanotubes, multi-walled nanotubes, and a mixture thereof.

4. The method of claim 3, wherein the carbon nanotubes comprise single-walled carbon nanotubes.

5. The method of claim 1, wherein the liquid medium comprises a solvent selected from water, ethanol, alcohol, NMH, and mixtures thereof.

6. The method of claim 1, wherein the liquid dispersion further comprises a surfactant.

7. The method of claim 1, wherein the electrode active material is selected from oxides of Ni, Mn, Co, Al, Mg, Ti, Li, and mixtures thereof.

8. The method of claim 1, wherein the electrode active material comprises lithium nickel manganese cobalt oxide.

9. The method of claim 1, wherein the carbon nanotubes are produced in a synthesis reactor coupled with a collector, the collector containing the liquid medium to capture the floating carbon nanotubes produced in the synthesis reactor, and the synthesis reactor comprising a metal catalyst precursor, a carbon source, and nanotube growth promoter, and a carrier gas.

10. The method of claim 9, wherein the carbon source is selected from hydrocarbon, carbon monoxide, carbon dioxide, and mixtures thereof; wherein the nanotube growth promoter is selected from thiophene and hydrogen gas; and wherein the carrier gas is selected from argon, hydrogen, nitrogen, and mixtures thereof.

* * * * *